(12) United States Patent
Colby

(10) Patent No.: US 6,563,533 B1
(45) Date of Patent: May 13, 2003

(54) ERGONOMICALLY DESIGNED APPARATUS FOR SELECTIVELY ACTUATING REMOTE ROBOTICS CAMERAS

(75) Inventor: Charles E. Colby, Palo Alto, CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 0 days.

(21) Appl. No.: 09/003,475

(22) Filed: Jan. 6, 1998

(51) Int. Cl.$^7$ .................. H04N 5/232; H04N 5/225
(52) U.S. Cl. .................. 348/211.4; 348/211.7; 348/373
(58) Field of Search .................. 348/14.05, 14.09, 348/14.11, 143, 152, 159, 211, 222, 374, 373, 375, 722, 211.99, 211.4, 211.7, 222.1

(56) References Cited

U.S. PATENT DOCUMENTS

| | | | | |
|---|---|---|---|---|
| 4,945,367 A | * | 7/1990 | Blackshear | 348/143 |
| 5,206,732 A | * | 4/1993 | Hudson | 348/159 |
| 5,222,897 A | * | 6/1993 | Collins et al. | 439/157 |
| 5,430,511 A | * | 7/1995 | Paff et al. | 348/143 |
| 5,483,229 A | * | 1/1996 | Tamura et al. | 340/691.7 |
| 5,583,796 A | * | 12/1996 | Reese | 348/152 |
| 5,801,771 A | * | 9/1998 | Ohwaki et al. | 348/211 |
| 5,825,432 A | * | 10/1998 | Yonezawa | 348/159 |
| 5,929,904 A | * | 7/1999 | Uchida | 348/211 |
| 6,002,995 A | * | 12/1999 | Suzuki et al. | 348/143 |
| 6,304,290 B1 | * | 10/2001 | Bailly | 348/159 |

OTHER PUBLICATIONS

Data Sheet, Sony BKS-R3209Universal Control Unit, pp. 10–13.

* cited by examiner

Primary Examiner—Wendy R. Garber
Assistant Examiner—Jacqueline Wilson
(74) Attorney, Agent, or Firm—Wagner Murabito & Hao LLP

(57) ABSTRACT

A ergonomically designed apparatus for selectively actuating remote robotics cameras. The present invention enables an operator to leave his hand on the robotics controller while selecting any one of several remote robotics cameras. In one embodiment, a selector unit comprises twelve buttons each corresponding to one remote robotics cameras arranged in two columns. The robotics controller, comprising a joystick having a rotatable knob on a top end, is juxtaposed adjacent to a vertical side of the columns of buttons such that an operator may adjust the robotics controller while simultaneously selecting the remote robotics cameras. The camera selector may include a first circuit board containing passive electronics perpendicularly coupled to a second circuit board containing active electronics. The first circuit board and the buttons may be mounted to the face panel by closely placed screws and heavy spacers designed to withstand physical shock.

9 Claims, 5 Drawing Sheets

ABSTRACT # ERGONOMICALLY DESIGNED APPARATUS FOR SELECTIVELY ACTUATING REMOTE ROBOTICS CAMERAS

FIELD OF THE INVENTION

The present invention generally relates to the fields of broadcasting equipment and closed-circuit television systems. More specifically, the present invention relates to a control panel for selectively actuating remote robotics cameras.

BACKGROUND OF THE INVENTION

Recent advances in automatic focusing systems in cameras and feedback control have facilitated the development of automatic robotics camera systems. In these systems, cameras are no longer manually operated by cameramen. Rather, the cameras are remotely actuated by operators in a remote control room. Typically, one remote camera is controlled by a separate camera control unit (CCU), each of which may include a joystick for controlling the movement of a camera.

A prior art camera control apparatus is described in U.S. Pat. No. 5,206,732 to Hudson and assigned to Sony Broadcast & Communications Limited, of Basingstoke, U. K., which is hereby incorporated by reference. The camera control apparatus as disclosed in Hudson includes a CCU for each of several cameras to be controlled by the apparatus. Each remote control panel is connected to the associated camera control unit whereby technical operational control of each camera can be effected at the associated remote control panel. However, because one individual remote control panel is required for a camera, this prior art system requires a large amount of desktop space.

In order to conserve space on the over-crowded desktop, a prior art remote control panel as illustrated in FIG. 1 has been devised. As shown, an apparatus 10 includes a panel 12 with two rows of horizontally disposed buttons 16, a robotics controller 14 juxtaposing the rows of buttons, and a zoom control 18 next to the robotics controller 14. Each of the buttons 16 is for selecting a respective one of the several robotics cameras to be controlled by the apparatus 10. The robotics controller 14 may include a joystick for actuating the selected camera, and a control knob 18 for adjusting a zoom of the camera. In order to accommodate long rows of buttons 16, the panel 12 is typically over 24 inches long.

Thus, an operator has to be highly dexterous and highly trained because he has to move his hands from the robotics controller 14 to an end of the panel 12 to select one of the cameras, and to the zoom control 18, and back to the robotics controller 14 again in a short time. Often, if the director requires shots from many different angles with lots of zoom-ins and zoom-outs, it is very difficult for the operator to perform all these operations within the given time constraints. In addition, accuracy is also compromised since it is likely for the operator to make mistakes in stressful situations. When the wrong cameras are selected, it is often necessary to re-shoot the scenes. As a result, significant amount of time and money is wasted using this prior art solution.

Another disadvantage of the prior art design is that active electronic components are mounted directly beneath the panel 12. Thus, the electronic components are subject to physical shock and risk being damaged. When one component is damaged, the whole circuit board including both functioning and malfunctioning components has to be replaced. Often, the electronic components are custom-made and therefore, it may take a long time before finding a replacement. Down-time for the remote robotics camera system can be very costly as expensive cameramen have to be hired.

Thus, what is needed is a remote camera selector panel that allows an operator improve the speed and accuracy of selectively actuating a remote camera. What is further needed is a remote camera selector panel which allows the operator to select any one of the remote cameras without removing his or her hand from a robotics controller unit. What is further needed is a shock-resistant selector panel that protects valuable electronics within the selector panel from being damaged by physical force. What is still needed is a selector panel that contain modular parts which can be replaced or repaired easily when one of the parts malfunctions. What is still further needed is a selector panel which is compact in design so as to take up minimum desktop space. The present invention provides an effective, integrated solution that meets the above needs.

SUMMARY OF THE INVENTION

The present invention is a ergonomically designed apparatus for selectively actuating remote robotics cameras. The present invention enables an operator to leave his hand on the robotics controller while selecting any one of several remote robotics cameras. In one embodiment, a selector unit comprises twelve buttons each corresponding to one remote robotics cameras arranged in two columns. The robotics controller, comprising a joystick having a rotatable knob on a top end, is juxtaposed adjacent to a vertical side of the columns of buttons such that an operator may adjust the robotics controller while simultaneously selecting the remote robotics cameras.

In one embodiment, the camera selector includes a first circuit board containing passive electronics perpendicularly coupled to a second circuit board containing active electronics. The first circuit board and the buttons may be mounted to a face panel by closely placed screws and heavy spacers designed to withstand physical shock.

DETAILED DESCRIPTION OF THE PREFERRED EMBODIMENT

In the following detailed description of the present invention relating to an ergonomically engineered apparatus for selectively actuating remote robotics cameras, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as to avoid unnecessarily obscuring aspects of the present invention.

Figure 1:
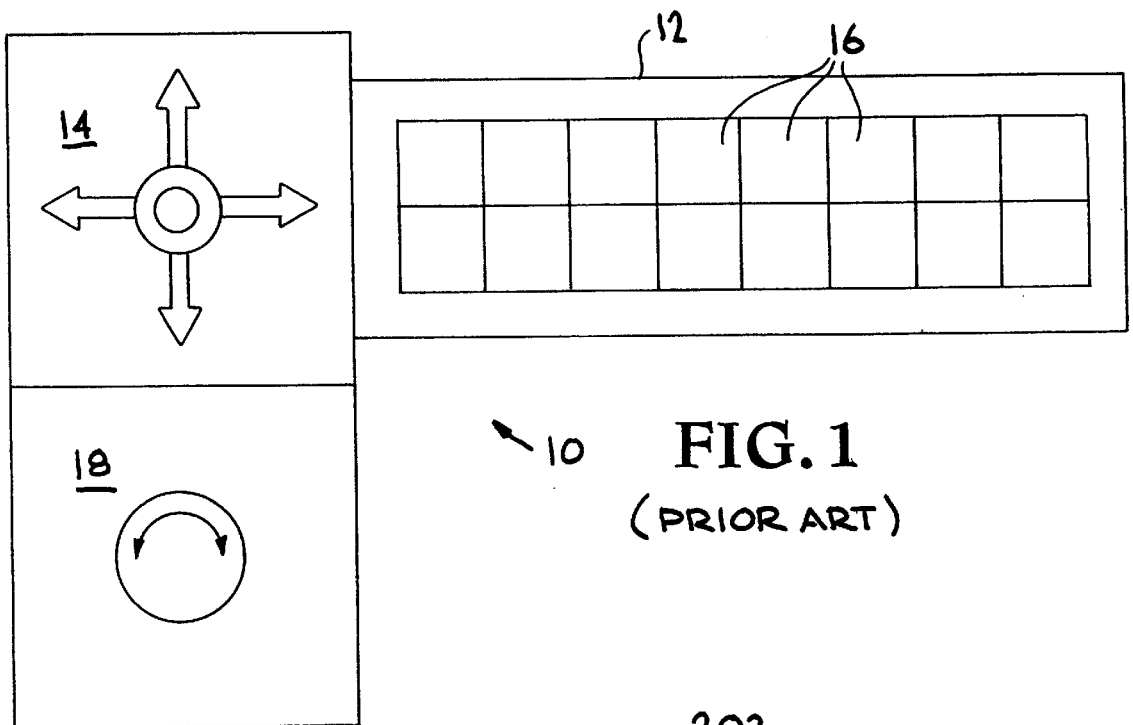
FIG. 1 illustrates a prior art remote robotics camera selector panel located on a desktop in a control room of a recording studio.
Figure 2B:
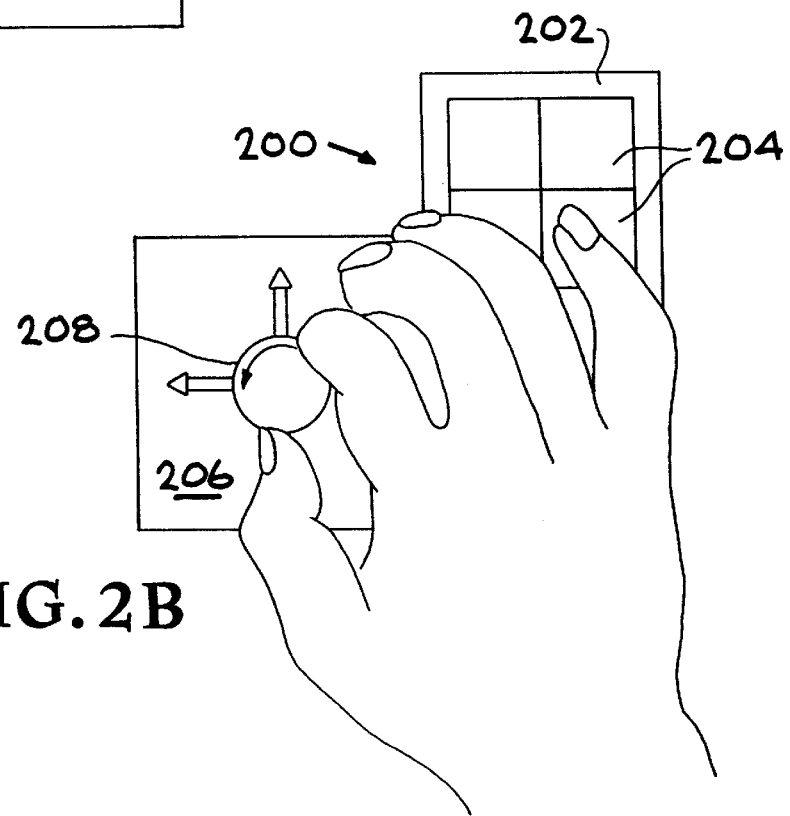
FIG. 2b illustrates the ergonomically engineered apparatus as shown in FIG. 2a being operated by an operator.
Figure 2A:
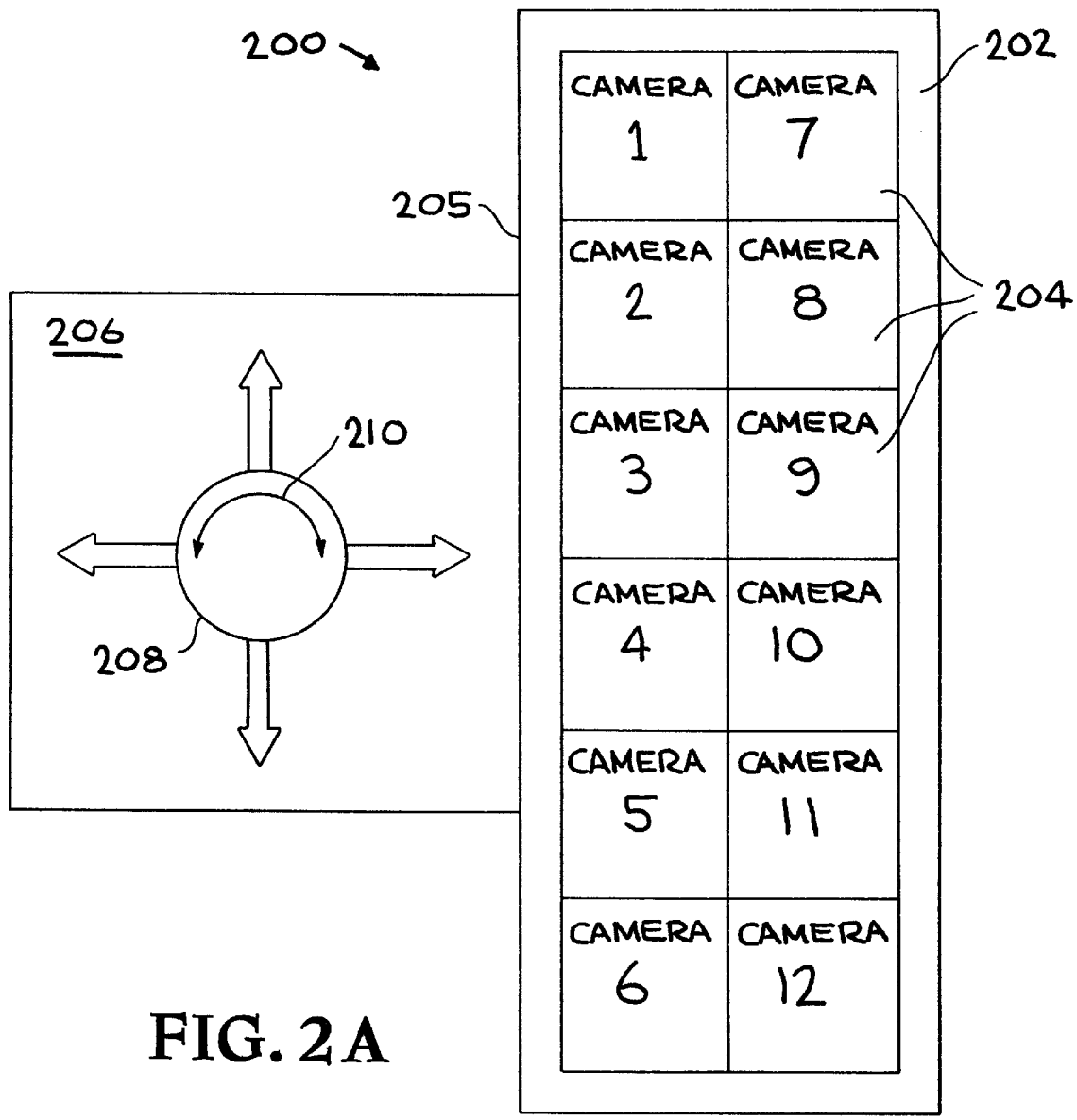
FIG. 2a illustrates a top plan view of an ergonomically engineered apparatus for selecting a remote robotics camera according to the present invention.

FIG. 2a illustrates a top plan view of an apparatus 200 for selectively activating a remote robotics camera in accordance with the present invention. As shown, the apparatus 200 comprises a selector unit 202 including twelve vertically aligned buttons 204 each for selecting a respective one of several remote robotics cameras (not shown), and a robotics controller unit 206 juxtaposing a vertical side 205 of the selector unit 202. The buttons 204, when pushed, selects one of the several remote cameras. In one embodiment, only a single remote camera can be selected at a time. Therefore, the buttons 204 are configured to be depressed one at a time.

The robotics controller unit 206 includes a joystick 208 having a rotatable knob 210. The joystick 208 is configured to move in any directions planar to the controller unit 206, and is configured to actuate one of the remote cameras selected by the selector unit 202. In one embodiment, when the joystick 208 is moved in a vertical direction, a camera selected by the selector panel 202 will tilt up and down. And, when the joystick 208 is moved in a horizontal direction, the selected camera will move sideways. The knob 210 may be located at a top end of the joystick 208, and is configured for controlling a zoom-in of the selected camera. In one embodiment, the knob 210 is configured to zoom when turned clockwise, and configured to zoom out when turned counter-clockwise.

It is important to note that the buttons 204 are ergonomically aligned in a vertical direction and ergonomically positioned adjacent to the vertical side 205 of the controller unit 206. Preferably, the robotics controller 206 has a width of 3.5 inches, and a length of 7" inches. Further, the buttons are preferably located Z inches from the joystick 208, and are measured 0.75 by 0.75 inches.

FIG. 2b illustrates a top plan view of the apparatus 200 when being operated by an operator's hand. As shown, the operator is using his thumb and index finger to manipulate the joystick 208 while using his little finger to depress any one of the buttons 204 to select an appropriate one of the remote cameras. The operator, using the present invention, no longer needs to remove his hand from the robotics controller 206 in order to reach buttons 204. In this way, objectives of the present invention including improving speed and accuracy of operation and improving ease of use of the remote robotics cameras are achieved.

Figure 3A:
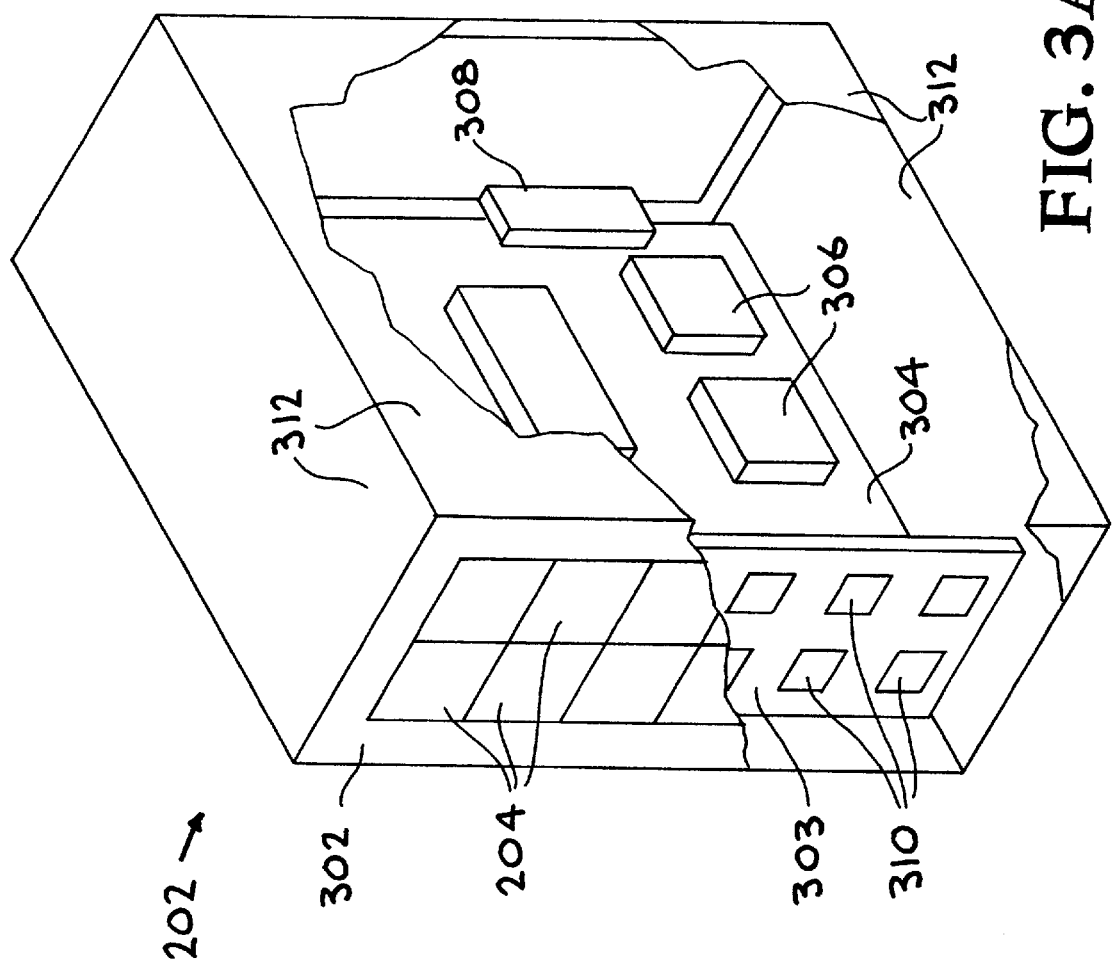
FIG. 3a illustrates a partially exposed perspective view of a selector unit according to the present invention with part of a face panel and part of a side panel removed, revealing the underlying circuit boards.

FIG. 3a illustrates a partial exposed perspective view of the selector panel 202 in accordance with the present invention. As shown, the selector unit 202 comprises a face panel 302 and side panels 312. Mounted under the face panel 302 is a first circuit board 303 which contains passive electronic components 310 such as switches. The first circuit board 303 is coupled to a second circuit board 304 which contains expensive electronic components 306 such as application specific integrated circuits (ASICs) specially manufactured for the selector unit 202. The circuit board 304 is mounted to one of the side panels 312. In addition, the circuit board 303 includes a connector 308 for coupling to remote cameras 405 and routing switches 410 and 420 (FIG. 4).

Figure 3B:
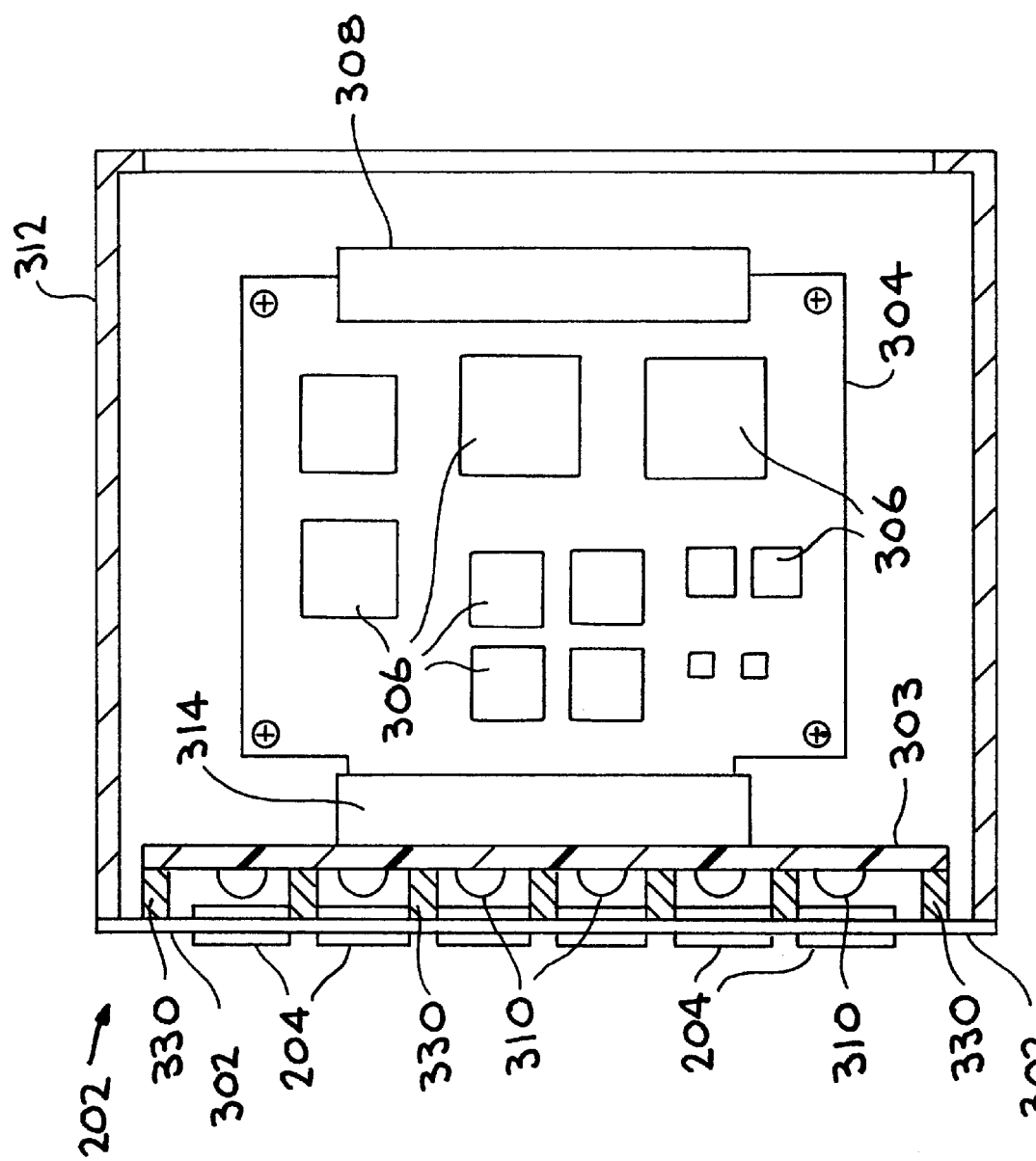
FIG. 3b is a side view of the selector unit with a side panel removed.

FIG. 3b illustrates an side view of the selector unit 202 as shown in FIG. 3a with one of the side panels 312 removed. As shown, the first circuit board is mounted to the face panel 302, and is coupled to the second circuit board 304 via male-female connectors 314. In one embodiment, the first circuit board and the second circuit board are mounted perpendicularly to each other. This configuration offers at least two advantages over the prior art. First, by separating the passive electronic components 310 from the active electronic components 306, the selector unit 202 become more easily repairable in the event that one of the passive components 310 and the active components 306 fails. For instance, electrical surge may damage the active electronic components 306, but may not damage the passive electronic components 310. In this situation, only the second circuit board 304 needs to be replaced.

Secondly, the risk of physically damaging the more expensive active electronic components 306 is lowered in the present invention. An operator, in frustration, may hit the face panel 302 with all his might. In such an event, the worst thing he could do is to break the face panel 302, the buttons 204, and the first circuit board 303. The second circuit board 304 and the more expensive electronic components 306 mounted thereon are thus shielded from physical damage and shock. The male-female connector 314 connecting the first circuit board 303 and the second circuit board 304 may also function as a shock absorber in the present invention. In one embodiment, the face panel 302 is made from reinforced heavy plastic to withstand severe physical punishment. The selector unit 202 may also include heavy spacers 330 placed between the face panel 302 and the first circuit board 303 for reinforcement.

Figure 4:
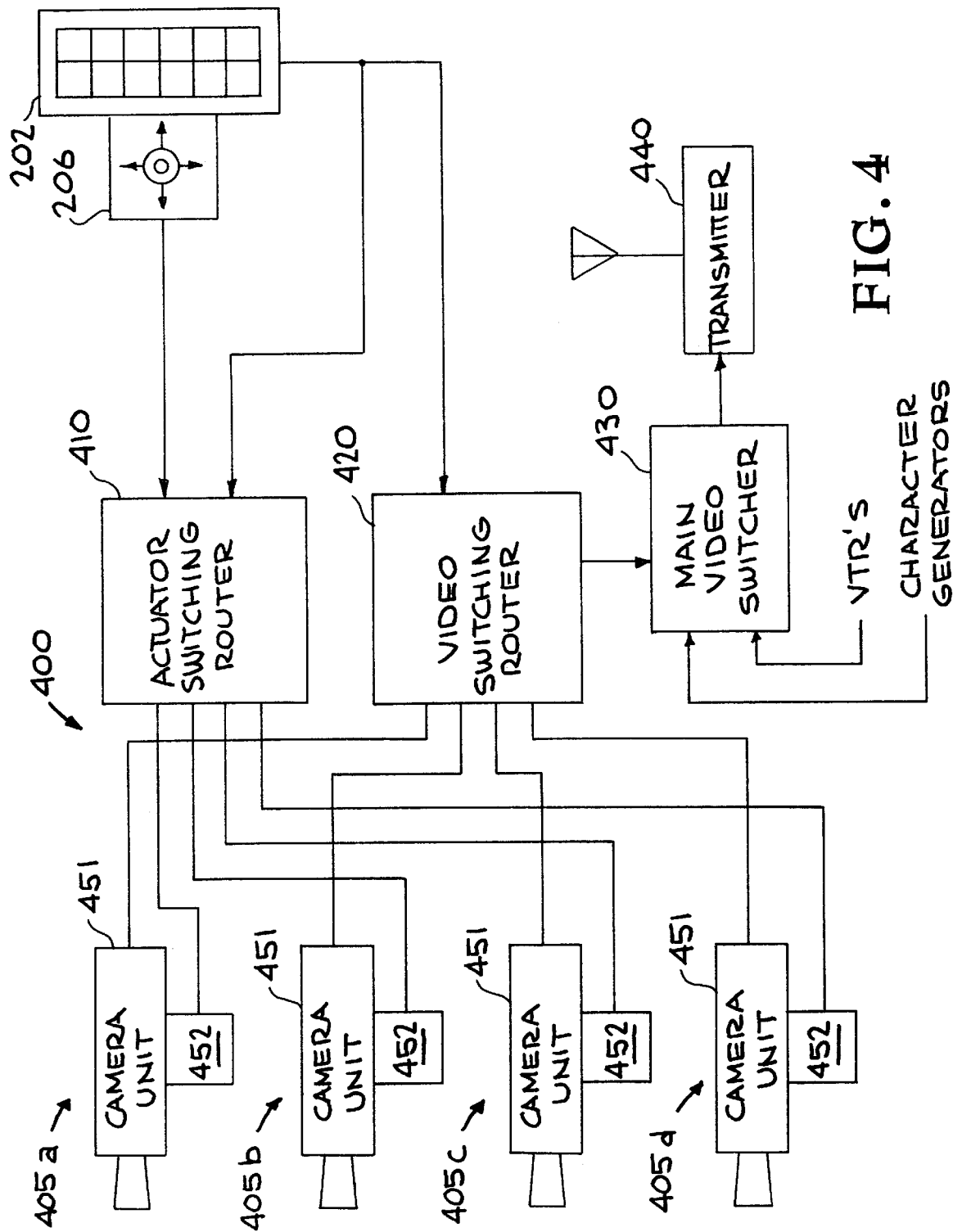
FIG. 4 illustrates a block diagram of a remote robotics camera system in accordance with the present invention.

FIG. 4 illustrates a system block diagram of a remote robotics camera controller system 400 according to the present invention. As shown, the system 400 comprises a selector unit 202 as shown in FIGS. 2–3, a robotics controller unit 206 juxtaposing the selector unit 202, an actuator switching router 410 coupled to the controller unit 206 and to the selector unit 202, a video switching router 420, and a plurality of remote robotics cameras 405a–d each having a camera unit 451 coupled to the video switching router 420, and an actuator unit 452 coupled to the actuator switching router 410. The system 400 may comprise any number of remote robotics cameras 405. However, only four cameras 405a–d are shown for simplicity.

The actuator switching router 410, upon receiving an appropriate select signal from the selector unit 202, routes control signals from the robotics controller unit 206 to a selected one of the remote robotics cameras 405. The video routing switcher 420, on the other hand, routes video signals from a selected one of the remote robotics cameras 405 to a main video switcher 430 upon receiving the appropriate select signal from the selector unit 202.

In one embodiment, the main video switcher 430 of FIG. 4 may be coupled to receive video signals from video tape recorders (VTRs) and other broadcast equipment such as character generators. The main video switcher 430 is coupled to a transmitter 440 for transmitting the video signals to other TV stations or to be broadcast to the public. In the preferred embodiment, the appropriate signals generated by the selector unit 202 are compliant with RS-422 standard. It should be apparent to those skilled in the art, upon reading the disclosure, that the selector unit 202 may generate signals that are compliant with other standards, such as RS-432 or RS-485. Switching routers 410, 420 and main communication video switcher 430 are well known in the art, and are therefore not discussed in detail here so as to avoid obscuring aspects of the present invention.

An ergonomically designed and engineered apparatus for selecting a remote robotics camera in a recording studio has thus been described. By aligning selector buttons in a vertical direction along a controller unit, an operator is allowed to select any one of the remote cameras with maximum efficiency and accuracy. In addition, by separating passive electronics and active electronics and placing them on two separate circuit boards, repair of the apparatus is made easier and risk of damages to the active electronics is significantly lowered.

What is claimed is:

1. An apparatus for selectively actuating a plurality of remote robotics cameras, the apparatus comprising:
    a selector unit for selecting one of the plurality of remote cameras, the selector unit including a plurality of buttons, each button corresponding to one of the plurality of remote cameras;
    a robotics controller positioned adjacent to the selector unit for actuating the selected one of the remote robotics cameras, wherein all buttons of the plurality are configured to be reached by an operator with one hand without removing the hand from the robotics controller;
    a face panel surrounding the buttons;
    a first circuit board mounted beneath the face panel, wherein the first circuit board contains a plurality of switches, further wherein each of the switches corresponds to a respective one of the buttons;
    a side panel mounted perpendicularly to the face panel; and
    a second circuit board mounted to the side panel, wherein the second circuit board is perpendicularly coupled to the first circuit board, wherein the second circuit board is configured to be protected from physical damage by the first circuit board.

2. The apparatus according to claim 1 further comprising a shock absorber mounted between the first circuit board and the second circuit board.

3. The apparatus according to claim 1 wherein physical shock is absorbed by a connector for electrically coupling the first circuit board to the second circuit board.

4. The apparatus according to claim 1 wherein the face panel is made from a heavy shock-resistant material.

5. The apparatus according to claim 4 wherein the buttons are made from the heavy shock-resistant material.

6. An apparatus for selectively actuating a plurality of remote robotics cameras, the apparatus comprising:
    a plurality of buttons for selecting a respective one of the remote robotics cameras;
    a face panel surrounding the buttons;
    a first circuit board mounted beneath the face panel, wherein the first circuit board contains a plurality of switches each corresponding to a respective one of the buttons, further wherein one of the remote robotics cameras is selected when a respective switch is toggled;
    a side panel mounted perpendicularly to the face panel; and
    a second circuit board mounted to the side panel, wherein the second circuit board is perpendicularly coupled to the first circuit board, wherein the second circuit board is configured to be protected from physical damage by the first circuit board.

7. The apparatus according to claim 6 further comprising a shock absorber mounted between the first circuit board and the second circuit board.

8. The apparatus according to claim 6 wherein physical shock is absorbed by a connector for electrically coupling the first circuit board to the second circuit board.

9. The apparatus according to claim 6 wherein the face panel is made from a heavy shock-resistant plastic material.

* * * * *